US012691443B2

(12) United States Patent
Li et al.

(10) Patent No.: US 12,691,443 B2
(45) Date of Patent: Jul. 28, 2026

(54) METHODS AND SYSTEMS FOR UTILIZING CARBON DIOXIDE IN FLUE GAS

(71) Applicant: Chevron U.S.A. Inc., San Ramon, CA (US)

(72) Inventors: Lin Li, San Ramon, CA (US); Tengfei Liu, Fairfield, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 523 days.

(21) Appl. No.: 18/242,703

(22) Filed: Sep. 6, 2023

(65) Prior Publication Data

US 2025/0073695 A1      Mar. 6, 2025

(51) Int. Cl.
| | |
|---|---|
| *B01J 38/00* | (2006.01) |
| *B01D 53/18* | (2006.01) |
| *B01J 38/12* | (2006.01) |
| *C25B 1/02* | (2006.01) |
| *C25B 1/23* | (2021.01) |

(52) U.S. Cl.
CPC .............. *B01J 38/12* (2013.01); *B01D 53/18* (2013.01); *C25B 1/02* (2013.01); *C25B 1/23* (2021.01)

(58) Field of Classification Search
None
See application file for complete search history.

(56) References Cited

U.S. PATENT DOCUMENTS

| | | | | |
|---|---|---|---|---|
| 11,043,684 | B2 * | 6/2021 | Jahnke | ................ H01M 8/0668 |
| 2014/0076213 | A1 | 3/2014 | Ingram et al. | |

| | | | |
|---|---|---|---|
| 2014/0272734 | A1 | 9/2014 | Braun et al. |
| 2023/0020698 | A1 | 1/2023 | Hannemann et al. |
| 2023/0069515 | A1 * | 3/2023 | Blennow ................... C25B 1/02 |

FOREIGN PATENT DOCUMENTS

| | | |
|---|---|---|
| CN | 116251447 A | 6/2023 |
| WO | 2023089177 A1 | 5/2023 |

OTHER PUBLICATIONS

PCT/US2024/038541, Partial International Search Report, Oct. 17, 2024, 13 pages.
PCT/US2024/038541, International Search Report, Dec. 18, 2024, 8 pages.

* cited by examiner

*Primary Examiner* — Stefanie J Cohen
(74) *Attorney, Agent, or Firm* — Michael E. Carmen; Terrence M. Flaherty

(57)      ABSTRACT

A method includes combusting a fuel stream in a combustion unit in the presence of a first oxygen enriched carbon dioxide stream received from an anode of an electrolyzer to generate a hot flue gas stream comprising carbon dioxide, steam, unconsumed oxygen, $NO_x$ and $SO_x$, cooling the hot flue gas stream in a heat exchanger by supplying a water stream to the heat exchanger as a heat transfer medium to generate a cooled flue gas stream effluent, processing the cooled flue gas stream effluent in one or more separation units to generate a carbon dioxide rich gas stream and a carbon dioxide lean gas stream, and passing the carbon dioxide rich gas stream to the anode of the electrolyzer to generate a second oxygen enriched carbon dioxide stream for sending to the combustion unit.

20 Claims, 5 Drawing Sheets

METHODS AND SYSTEMS FOR UTILIZING CARBON DIOXIDE IN FLUE GAS

BACKGROUND

Many energy production processes release carbon dioxide. In order to reduce the climate-damaging effects of carbon dioxide in the atmosphere, the carbon dioxide can be captured or converted into other substances. However, this is made more difficult by the fact that carbon dioxide is stable and not very reactive. In addition, the carbon in the carbon dioxide molecule is in its highest oxidation state. Thus, carbon dioxide can no longer be used to generate energy by means of incineration.

SUMMARY

In accordance with an illustrative embodiment, a method comprises:

combusting a fuel stream in a combustion unit in the presence of a first oxygen enriched carbon dioxide stream received from an anode of an electrolyzer comprising an anode, a cathode, and an electrolyte inserted between the anode and the cathode to generate a hot flue gas stream comprising carbon dioxide, steam, unconsumed oxygen, $NO_x$, and $SO_x$, cooling the hot flue gas stream in a heat exchanger by supplying a water stream to the heat exchanger as a heat transfer medium to generate a cooled flue gas stream effluent, processing the cooled flue gas stream in one or more separation units to generate a carbon dioxide rich gas stream and a carbon dioxide lean gas stream, and passing the carbon dioxide rich gas stream to the anode of the electrolyzer to generate a second oxygen enriched carbon dioxide stream for sending to the combustion unit.

In accordance with another illustrative embodiment, a system comprises:

an electrolyzer comprising an anode, a cathode, and an electrolyte inserted between the anode and the cathode and configured to receive a first carbon dioxide rich gas stream to the anode to generate an oxygen enriched carbon dioxide stream, a combustion unit configured to combust a fuel stream in the presence of the oxygen enriched carbon dioxide stream received from the anode of the electrolyzer to generate a hot flue gas stream comprising carbon dioxide, steam, unconsumed oxygen, $NO_x$ and $SO_x$, a heat exchanger configured to cool the hot flue gas stream by supplying a water stream as a heat transfer medium to generate a cooled flue gas stream effluent, and one or more separation units configured to process the cooled flue gas stream to generate a second carbon dioxide rich gas stream and a carbon dioxide lean gas stream.

In accordance with yet another illustrative embodiment, a method comprises:

combusting a fuel stream in a combustion unit in the presence of a first oxygen enriched carbon dioxide stream to generate a hot flue gas stream comprising carbon dioxide, steam, unconsumed oxygen, $NO_x$ and $SO_x$, cooling the hot flue gas stream in a heat exchanger by supplying a water stream to the heat exchanger as a heat transfer medium to generate a cooled flue gas stream effluent, processing the cooled flue gas stream effluent in one or more separation units to generate a carbon dioxide rich gas stream and a carbon dioxide lean gas stream, generating an oxygen stream from an anode of the electrolyzer, and combining the oxygen stream and the carbon dioxide rich gas stream to generate a second oxygen enriched carbon dioxide stream for sending to the combustion unit.

BRIEF DESCRIPTION OF THE DRAWINGS

In combination with the accompanying drawings and with reference to the following detailed description, the features, advantages, and other aspects of the implementations of the present disclosure will become more apparent, and several implementations of the present disclosure are illustrated herein by way of example but not limitation. In the accompanying drawings.

DETAILED DESCRIPTION

Figure 1:
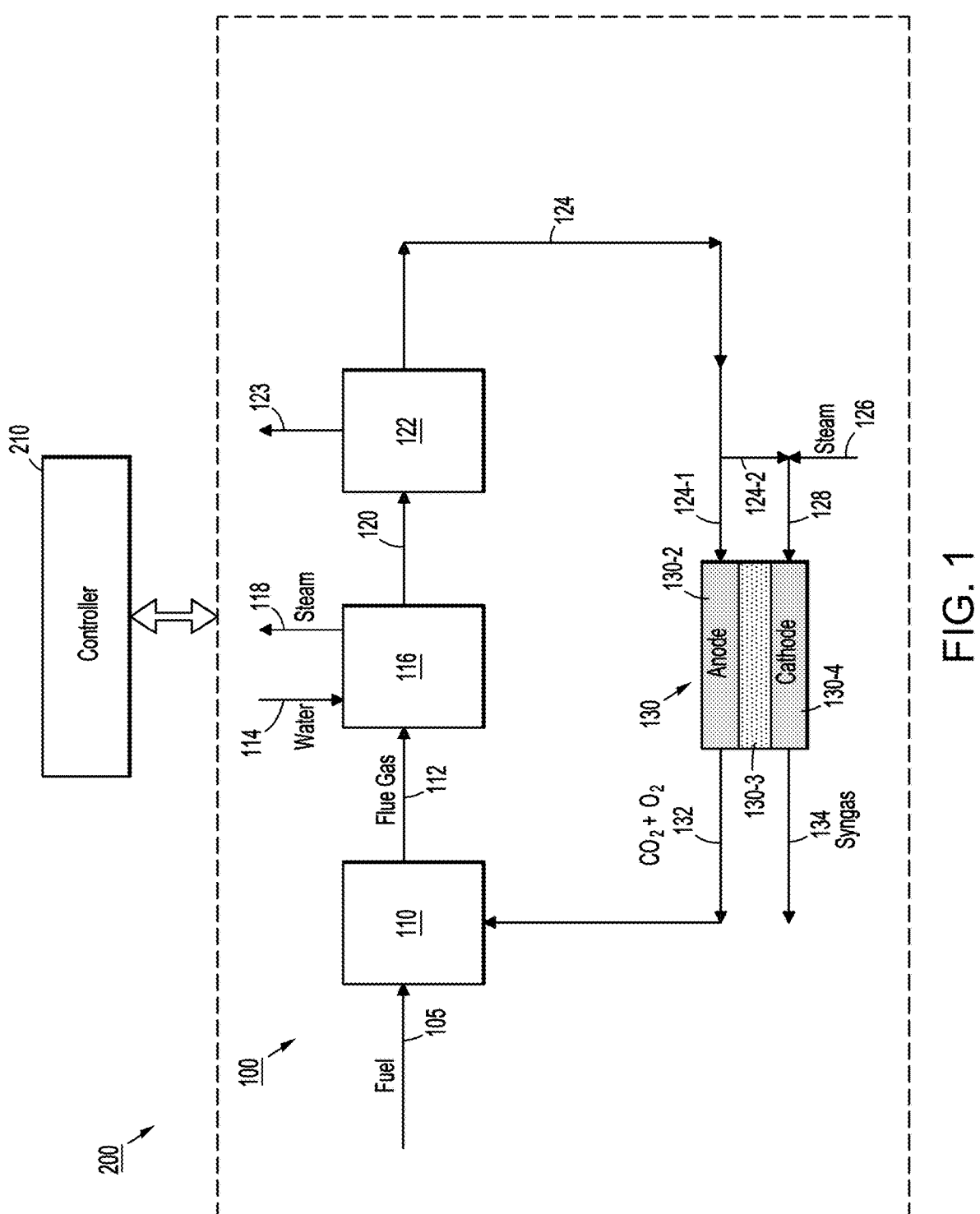
FIG. 1 illustrates a process and system for the conversion of carbon dioxide to syngas, according to an illustrative embodiment.

Various illustrative embodiments described herein are directed to processes for utilizing carbon dioxide ($CO_2$) from flue gas such as, for example, converting carbon dioxide from flue gas to syngas or to chemicals and/or fuels. The conversion of carbon dioxide into added value chemicals, materials and fuels offers one way to reduce carbon emissions.

One major source of carbon dioxide emission is the flue gas that is exhausted as a result of a large industrial combustion process, e.g., refinery heaters and boilers, steam generators, gas turbines, power plants, etc., in large energy consuming industries such as cement, iron and steel and chemical production and oil refining. For a conventional combustion process air is used and the flue gas will be composed primarily of nitrogen, carbon dioxide, steam, unconsumed oxygen and small amounts of pollutants dependent on the fuel selected such as nitrogen oxides and sulfur dioxide, etc. For an oxy-combustion process, no nitrogen gas is introduced to the combustion process, and the flue gas will be composed primarily of carbon dioxide, steam, unconsumed oxygen and small amounts of pollutants dependent on the fuel selected such as nitrogen oxides and sulfur dioxide, etc. Before carbon dioxide can be sequestered from a large industrial source, it must be captured in a relatively pure form. For example, the flue gas can be readily cooled separating out the water and producing a concentrated carbon dioxide stream, which can be further purified to obtain a high-purity carbon dioxide stream. This stream can be sequestered to prevent the release of carbon dioxide into the atmosphere. Alternatively, the carbon dioxide may be captured and compressed to a liquid, which can then be sold to industry. Otherwise, the carbon dioxide can be reacted with other chemicals to produce a solid.

However, converting carbon dioxide in flue gas to make valuable products includes multiple steps. The first step can be separating the carbon dioxide since the carbon dioxide conversion process typically requires a carbon dioxide stream with high concentration or purity as its feed. For example, flue gas from furnace burning fossil fuel contains typically from about 10 to about 20% carbon dioxide. Therefore, a carbon dioxide separation process is needed to concentrate and purify carbon dioxide to a much higher concentration.

Currently, the most commonly used process of post-combustion capture is through absorption of flue gas with aqueous amine solvents in a packed or trayed absorber column. However, it is well recognized that such a process requires high CAPEX (Capital Expenses) and high energy consumption, making the process relatively expensive.

Another process for carbon dioxide separation is by oxy-combustion. An oxy-combustion process will generate a high concentration carbon dioxide stream, but it requires an ASU (Air Separation Unit) to obtain the necessary oxygen needed, and also requires multiple steps such as dehydration to purify the carbon dioxide.

Definitions

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology can be applied, as long as that definition does not conflict with any other disclosure or definition applied herein or render indefinite or non-enabled any claim to which that definition is applied. To the extent that any definition or usage provided by any document incorporated herein by reference conflicts with the definition or usage provided herein, the definition or usage provided herein controls.

While systems and methods are described in terms of "comprising" various components or steps, the systems and methods can also "consist essentially of" or "consist of" the various components or steps, unless stated otherwise.

The terms "a," "an," and "the" are intended to include plural alternatives, e.g., at least one. The terms "including", "with", and "having", as used herein, are defined as comprising (i.e., open language), unless specified otherwise.

Various numerical ranges are disclosed herein. When Applicant discloses or claims a range of any type, Applicant's intent is to disclose or claim individually each possible number that such a range could reasonably encompass, including end points of the range as well as any sub-ranges and combinations of sub-ranges encompassed therein, unless otherwise specified. For example, all numerical end points of ranges disclosed herein are approximate, unless excluded by proviso.

Values or ranges may be expressed herein as "about", from "about" one particular value, and/or to "about" another particular value. When such values or ranges are expressed, other embodiments disclosed include the specific value recited, from the one particular value, and/or to the other particular value. Similarly, when values are expressed as approximations, by use of the antecedent "about," it will be understood that the particular value forms another embodiment. It will be further understood that there are a number of values disclosed therein, and that each value is also herein disclosed as "about" that particular value in addition to the value itself. In another aspect, use of the term "about" means ±20% of the stated value, ±15% of the stated value, ±10% of the stated value, ±5% of the stated value, ±3% of the stated value, or ±1% of the stated value.

Applicant reserves the right to proviso out or exclude any individual members of any such group of values or ranges, including any sub-ranges or combinations of sub-ranges within the group, that can be claimed according to a range or in any similar manner, if for any reason Applicant chooses to claim less than the full measure of the disclosure, for example, to account for a reference that Applicant may be unaware of at the time of the filing of the application. Further, Applicant reserves the right to proviso out or exclude any members of a claimed group.

A "fresh catalyst" as used herein denotes a catalyst which has not previously been used in a catalytic process.

A "spent catalyst" as used herein denotes a catalyst that has less activity at the same reaction conditions (e.g., temperature, pressure, inlet flows) than the catalyst had when it was originally exposed to the process. This can be due to a number of reasons, several non-limiting examples of causes of catalyst deactivation are coking or carbonaceous material sorption or accumulation, steam or hydrothermal deactivation, metals (and ash) sorption or accumulation, attrition, morphological changes including changes in pore sizes, cation or anion substitution, and/or chemical or compositional changes.

A "regenerated catalyst" as used herein denotes a catalyst that had become spent, as defined above, and was then subjected to a process that increased its activity to a level greater than it had as a spent catalyst. This may involve, for example, reversing transformations or removing contaminants outlined above as possible causes of reduced activity. The regenerated catalyst typically has an activity that is equal to or less than the fresh catalyst activity.

The term "electrode" means, in the sense of the present disclosure, an electronic conductor capable of capturing or releasing electrons. An oxidation reaction occurs at the anode, whereas a reduction reaction occurs at the cathode.

The term "electrolyzer," also called an "electrolysis device," is intended to mean a device for converting electrical energy, in particular renewable electrical energy, into chemical energy.

Although any processes and materials similar or equivalent to those described herein can be used in the practice or testing of the illustrative embodiments described herein, the typical processes and materials are herein described.

The non-limiting illustrative embodiments described herein overcome the drawbacks discussed above by providing processes for the electrochemical conversion of carbon dioxide from flue gas to chemicals and/or fuels. For example, the non-limiting illustrative embodiments described herein include a process for converting carbon dioxide to chemicals and/or fuels using electrolysis technology, and the integration of an electrolyzer with the combustion and carbon dioxide separation to significantly simplify the process and make the conversion of carbon dioxide to valuable products more economical.

The non-limiting illustrative embodiments of the present disclosure will be specifically described below with reference to the accompanying drawings. For the purpose of clarity, some steps leading up to the production of the conversion of carbon dioxide to chemical and/or fuels as illustrated in FIGS. 1-5 are omitted. In other words, one or more well-known processing steps which are not illustrated but are well-known to those of ordinary skill in the art have not been included in the figures. This is not intended to be interpreted as a limitation of any particular embodiment, or illustration, or scope of the claims.

Referring now to FIG. 1, system 100 includes combustion unit 110 for receiving a fuel stream 105 and an oxygen enriched carbon dioxide stream 132 from anode 130-2 of electrolyzer 130 comprising an anode 130-2, a cathode 130-4, and an electrolyte 130-3 inserted between the anode 130-2 and the cathode 130-4 where the fuel stream 105 is combusted in the presence of the oxygen enriched carbon dioxide stream 132 to generate a hot flue gas stream 112 including carbon dioxide, steam and relatively low concentrations of unconsumed oxygen. In illustrative embodiments, the hot flue gas stream 112 is typically a hot flue gas stream, i.e., a flue gas stream having a temperature of at least about 500° C.

The combustion unit 110 can be any reactor wherein a fuel or other source of carbon is combusted, completely or partially, with oxygen. For example, the combustion unit 110 might be a fired heater or boiler used in power plants or a steam generator or a gas-fired turbine. Alternatively, the combustion unit 110 might be a coal fired combustion reactor. The combustion reactor could also be a catalyst regenerator in a fluid catalytic cracker (FCC) reactor as discussed below with reference to FIG. 2, in which deposited coke on the catalyst particles is burned off in the presence of oxygen enriched carbon dioxide stream. Those skilled in the art will appreciate that other combustion type reactors that use oxygen may also be utilized and are within the scope of the present disclosure.

In an illustrative embodiment, the combustion unit 110 may be designed to combust any one or more of a number of fuel streams 105. In a non-limiting illustrative embodiment, suitable fuels for fuel stream 105 include, for example, coal, petroleum coke, biomass, char, natural gas, refinery fuel gas, and other hydrocarbon-based fuels. The fuel stream 105 may be in the form of a gas, a liquid or a solid or a combination thereof. The solid may be pelletized or otherwise fractured to a suitable particle size.

The fuel stream 105 is combusted in the presence of the oxygen enriched carbon dioxide stream 132 that provides the oxygen for the combustion reaction. The amount of oxygen in the oxygen enriched carbon dioxide stream 132, i.e., $CO_2$ and $O_2$, can be adjusted to a desired level controlled by the purge rate of the carbon dioxide to the anode 130-2 of the electrolyzer 130 as discussed below. The percentage of oxygen will depend, in part, on the fuel to be combusted and the temperature requirement in the combustion unit. For example, the percentage of oxygen by volume in the oxygen enriched carbon dioxide stream 132 can range from about 10 to about 50%, or from about 15 to about 30%, or from about 20 to about 25%.

In an illustrative embodiment, an operating temperature of the combustion unit 110, typically defined as bridgewall temperature, can generally range from about 700° C. to about 900° C. The combustion of the fuel stream 105 in the presence of the oxygen enriched carbon dioxide stream 132 produces a hot flue gas stream 112, i.e., a flue gas stream having a temperature of at least about 500° C. In an illustrative embodiment, hot flue gas stream 112 can have a temperature ranging from about 500° C. to about 700° C. In an illustrative embodiment, hot flue gas stream 112 can have a temperature of from about 550° C. to about 650° C.

In an illustrative embodiment, hot flue gas stream 112 including carbon dioxide, steam and relatively low concentrations of unconsumed oxygen produced from the combustion reaction is rich in carbon dioxide relative to oxygen. For example, the percentage of carbon dioxide by volume in the hot flue gas stream 112 can range from about 80% to about 95%, or from about 85% to about 90%, and the percentage of steam by volume in the hot flue gas stream 112 can be up to about 10%. In addition, the percentage of unconsumed oxygen by volume in the hot flue gas stream 112 can range from about 1% to about 5%, or from about 2% to about 3%. The hot flue gas stream 112 can further contain one or more additional gases such as, for example, $NO_x$, COS, and $SO_x$.

System 100 further includes heat exchanger 116 for receiving water stream 114 at or around room temperature, i.e., about 20° C., and hot flue gas stream 112 as heat transfer mediums to provide a steam stream effluent 118 and a cooled flue gas stream effluent 120. In other words, hot flue gas stream 112 delivers the heat in heat exchanger 116 to water stream 114 which evaporates liquid water into steam stream effluent 118, and the hot flue gas stream 112 is likewise cooled against water stream 114 in heat exchanger 116 which cools hot flue gas stream 112 to generate cooled flue gas stream effluent 120, i.e., a flue gas stream effluent having a temperature less than the temperature of hot flue gas stream 112, e.g., from about 100° C. to less than 500° C. As one skilled in the art will readily appreciate, the cooled flue gas stream effluent 120 can contain some amount of steam generated from the combustion reaction in the combustion unit 110. In some embodiments, the heat exchanger 116 may be a shell-and-tube, plate-fin, microchannel, spiral wound, or any other suitable heat-exchanger.

System 100 further includes separation unit 122 for receiving cooled flue gas stream effluent 120 to separate out at least one $SO_x$ in the cooled flue gas stream effluent 120 as well as water to generate a carbon dioxide rich gas stream 124, i.e., a high purity carbon dioxide stream, and a carbon dioxide lean gas stream 123. In some embodiments, the at least one $SO_x$ compound or plurality of $SO_x$ compounds in the flue gas stream is chosen from sulfur dioxide ($SO_2$), sulfur trioxide ($SO_3$), sulfur monoxide (SO), disulfur monoxide ($S_2O$), disulfur dioxide ($S_2O_2$), or any combination thereof. In an illustrative embodiment, carbon dioxide rich gas stream 124 can contain a percentage of carbon dioxide by volume in the carbon dioxide rich gas stream 124 of greater than or equal to about 95%, where the remaining amount contains unconsumed oxygen. In an illustrative embodiment, carbon dioxide rich gas stream 124 can contain a percentage of carbon dioxide by volume in the carbon dioxide rich gas stream 124 of greater than or equal to about 96%, where the remaining amount contains unconsumed oxygen. In an illustrative embodiment, carbon dioxide rich gas stream 124 can contain a percentage of carbon dioxide by volume in the carbon dioxide rich gas stream 124 of no greater than or equal to about 97%, where the remaining amount contains unconsumed oxygen.

Separation unit 122 for generating carbon dioxide lean gas stream 123 and carbon dioxide rich gas stream 124 from cooled flue gas stream effluent 120 can be any separation unit known in the art for removing at least one $SO_x$ and water. In an illustrative embodiment, separation unit 122 is a limestone scrubber.

If desired, system 100 can further include one or more additional separation units. For example, in the case where it is desired to remove the unconsumed oxygen from cooled flue gas stream effluent 120, system 100 can further include an oxygen separation unit (not shown). The oxygen separation unit can be before or after separation unit 122. In an illustrative embodiment, when further separating out unconsumed oxygen, carbon dioxide rich gas stream 124 can contain a percentage of carbon dioxide by volume in the carbon dioxide rich gas stream 124 of greater than or equal to about 98%. In an illustrative embodiment, carbon dioxide rich gas stream 124 can contain a percentage of carbon dioxide by volume in the carbon dioxide rich gas stream 124 of greater than or equal to about 99%. In an illustrative embodiment, carbon dioxide rich gas stream 124 can contain a percentage of carbon dioxide by volume in the carbon dioxide rich gas stream 124 of up to about 99.5%.

Accordingly, the carbon dioxide lean gas stream 123 can also be referred to as a waste stream 123 which is essentially depleted of carbon dioxide and contains, for example, the steam, unconsumed oxygen (when removed) and $SO_x$ as well as any other unwanted chemicals.

For example, in an illustrative embodiment, an oxygen separation unit for separating out unconsumed oxygen may function by contacting cooled flue gas stream effluent 120 with an aqueous alkaline solution, an aqueous amine solution, an aqueous carbonate and/or bicarbonate solution, with or without containing one or more catalysts such as carbonic anhydrase, a solid material or a porous sorbent material including, but not limited to, non-carbonaceous origin (zeolites, silica, metal-organic frameworks and porous polymers, alkali metal, and metal oxide carbonates) and carbonaceous origin (activated carbons and/or carbon fibers, graphene, ordered porous carbons, fibers), a solid structure with chemical sorbent materials including functional amine-based materials with or without cellulose, a solid polymer based material including polyethyleneimine silica, an aqueous solution combined with an anionic exchange resin, or combinations of any of the above.

In a non-limiting illustrative embodiment, an oxygen separation unit can include an absorber for selectively absorbing carbon dioxide from cooled flue gas stream effluent 120 using a carbon dioxide absorbing composition such as, for example, an aqueous alkaline solution, an aqueous amine solution, an aqueous carbonate and/or a bicarbonate solution, and optionally a blower for blowing cooled flue gas stream effluent 120 to the absorber. The blower can be any type of blower known to one skilled in the art. Generally, the pressure of cooled flue gas stream effluent 120 is around 1 bar. The blower can raise the pressure of the cooled flue gas stream effluent 120 to a pressure ranging from 1.1 to about 1.5 bar. The pressure is typically raised to overcome the pressure drop associated with flowing the gas through an absorber tower of the absorber.

In an illustrative embodiment, an absorber is a packed tower. The packing may be random packing, structured packing or any combination thereof. The randomly packed material can include, but is not limited to, Raschig rings, saddle rings, Pall rings, or any other known type of packing ring, or combination of packing rings. The structured packed material can include, but is not limited to, corrugated sheets, crimped sheets, gauzes, grids, wire mesh, monolith honeycomb structures, or any combination thereof. Examples of structured packing include Sulzer DX™, Mellapak™, Mellapak Plus™, Katapak™, and the like.

As discussed above, any uncondensed water present in the flue gas stream may form an aqueous solution containing a carbon dioxide absorbing composition, for example, an ionic absorbent. If the viscosity of the aqueous solution is not sufficient for use in the separating the carbon dioxide from the cooled flue gas stream effluent 120, then it may be necessary to add one or more diluents to the aqueous solution to further reduce its viscosity to a suitable viscosity for separating the carbon dioxide from the cooled flue gas stream effluent 120. Accordingly, a diluent stream can be present at the top of the column of the absorber to further hydrate the incoming carbon dioxide absorbing composition stream and reduce its viscosity as discussed above. In addition, a diluent stream can scrub any additional diluent that may be carried over into carbon dioxide rich gas stream 124 leaving the absorber to partly or completely remove any remaining unwanted impurities. Typically, the total amount of water and diluents, when present, in the carbon dioxide absorbing composition is largely dictated by viscosity requirements, and is generally less than about 80 wt. %. In one embodiment, the total amount of water present is from about 15 wt. % to about 80 wt. %.

In an illustrative embodiment, cooled flue gas stream effluent 120 can be contacted with a carbon dioxide absorbing composition stream such as an ionic absorbent stream in the absorber. In an embodiment, cooled flue gas stream effluent 120 can be introduced into an absorber and during the process of flow from the bottom up, for example, the carbon dioxide in cooled flue gas stream effluent 120 is absorbed by, for example, an ionic absorbent flowing from the top down. The end gas, i.e., carbon dioxide lean gas stream 123, which is essentially depleted of carbon dioxide, is removed from the absorber, for example, through a vent from the top of the absorber after contacting (or being scrubbed) by a diluent stream, and a carbon dioxide rich gas stream 124 is removed from the other end of the absorber for further processing as discussed below.

In one embodiment, from about 95% to about 99.5% of carbon dioxide in cooled flue gas stream effluent 120 has been removed to form carbon dioxide lean gas stream 123. The carbon dioxide rich gas stream 124 can contain some amount of steam that was generated from the combustion reaction in the combustion unit 110. The carbon dioxide rich gas stream 124 is split in a first portion 124-1 for sending to the anode 130-2 of electrolyzer 130 and second portion 124-2 for combining with steam ($H_2O$) feed stream 126 to form combined stream 128 for sending to the cathode 130-4 of electrolyzer 130.

The particular separation units discussed above are presented by way of example only, and system 100 may include additional or alternative separation units, as well as numerous distinct separation units in any combination, with each such separation unit comprising one or more components such as, for example, blowers, absorbers, strippers and the like.

System 100 further includes electrolyzer 130 for receiving first portion 124-1 of carbon dioxide rich gas stream 124 in anode 130-2 to generate oxygen enriched carbon dioxide stream 132 for sending to the combustion unit 110, and receiving combined stream 128 composed of second portion 124-2 of carbon dioxide rich gas stream 124 and steam ($H_2O$) feed stream 126 in cathode 130-4 to generate a syngas stream 134 including carbon monoxide (CO) and hydrogen ($H_2$) for sending downstream for further processing as discussed below. In an illustrative embodiment, electrolyzer 130 can be any suitable high temperature electrolyzer. In a non-limiting illustrative embodiment, electrolyzer 130 is a high temperature solid oxide electrolyzer (also referred to as SOEC) comprising:

a first porous conductive electrode, or "cathode", to be supplied with steam and carbon dioxide for the production of dihydrogen and carbon monoxide, a second porous conductive electrode, or "anode", via which the dioxygen ($O_2$) produced by the electrolysis of the water and carbon dioxide injected onto the cathode escapes, and a solid oxide membrane (dense electrolyte) sandwiched between the cathode and the anode, the membrane being anionically conductive at high temperatures, usually temperatures above about 600° C. and up to about 950° C.

In illustrative embodiments, a solid oxide electrolyzer can include a stack of elementary solid-oxide (co-)electrolysis cells each comprising an anode, a cathode, and an electrolyte inserted between the anode and the cathode, the cells being electrically connected in series, the stack comprising two electrical terminals for the supply of current to the cells and defining flow chambers for, with respect to the first chambers, the flow of steam, hydrogen and carbon dioxide over the cathodes and flow chambers for, with respect to the second chambers, the flow of oxygen, and carbon dioxide over the anodes.

In illustrative embodiments, a solid oxide electrolyzer generally relies on an electron source (external source of electricity). The heat and electricity to operate the solid oxide electrolyzer may be produced from renewable sources, such as solar, wind, geothermal, or hydropower. Heat may be added to the solid oxide electrolyzer to maintain a desired operating temperature of the solid oxide electrolyzer including the electrochemical reduction. In an illustrative embodiment, heat may be added to the solid oxide electrolyzer by, for example, resistive heating (e.g., at the solid oxide electrolyzer electrodes), a steam jacket, solar heating systems, etc.

In some embodiments, combined stream 128 composed of second portion 124-2 of carbon dioxide rich gas stream 124 and steam ($H_2O$) feed stream 126 participate in a reaction in a solid oxide electrolytic cell (SOEC) (electrolyzer 130) to generate oxygen enriched carbon dioxide stream 132 and syngas stream 134, and first portion 124-1 of carbon dioxide rich gas stream 124 participates as a purge gas. For example, the combined stream 128 composed of second portion 124-2 of carbon dioxide rich gas stream 124 and steam ($H_2O$) feed stream 126 may be reacted at a cathode 130-4 in the electrolyzer 130 and the first portion 124-1 of carbon dioxide rich gas stream 124 participates as a purge gas at an anode 130-2 of the electrolyzer 130, where the cathode 130-4 and anode 130-2 may be separated by an electrolyte 130-3. In some embodiments, the SOEC may operate at a temperature of about 700° C. to about 950° C. In some embodiments, the SOEC may operate at a temperature of about 700° C., about 720° C., about 730° C., about 740° C., about 750° C., about 760° C., about 770° C., about 780° C., about 790° C., about 800° C., about 810° C., about 820° C., about 830° C., about 840° C., about 860° C., about 880° C., about 900° C., about 910° C., about 920° C., about 930° C., about 940° C., or about 950° C., where any range from these limits are contemplated herein. In some embodiments, the cathode may operate at a temperature between about 750° C. to about 850° C., and the anode may operate at a temperature between about 750° C. to about 850° C.

In some embodiments, the SOEC may operate at a pressure between about 1 bar to about 20 bars. In some embodiments, the SOEC may operate at a pressure of about 1.02 bar, about 3 bar, about 5 bar, about 7 bar, about 9 bar, about 10 bar, about 15 bar or about 20 bar, where any range from these limits is contemplated herein. In some embodiments, the SOEC may operate at a pressure of about 1 bar to about 3 bar, e.g., about 1 bar, about 1.2 bar, about 1.4 bar, about 1.6 bar, about 1.8 bar, about 2.0 bar, about 2.2 bar, about 2.4 bar, about 2.6 bar, about 2.8 bar or about 3 bar, where any range from these limits are contemplated herein.

In implementations, the carbon dioxide electrolysis by the solid oxide electrolyzer may be at a temperature in a range of about 600° C. to about 950° C., or about 700° C. to about 800° C. and at atmospheric pressure.

The material of the solid oxide electrolyzer electrodes (i.e., cathode and anode) may be based on ceramic materials that exhibit stability through reduction-oxidation (redox) cycles, electrocatalytic activity, and mixed ionic and electronic conductivity in reducing atmospheres. The material of the solid oxide electrodes may be metal or metal oxide-based material (e.g., Ni-based electrodes). In some embodiments, the cathode and anode may be constructed of any suitable material including, for example, (La,Sr)(Fe,Co)$O_3$ (LSCF), (Sm,Sr) Co$O_3$, and Sr-doped LaMn$O_3$ for the anode electrode (anode) and Ni—YSZ, Ni—ScSZ, La$_2$NiO$_4$, and Ni—ZrO$_2$ for the cathode electrode. Electrode support materials and functional layers include nickel cermets, and other electronic conductors such as (Sr$_{0.8}$La$_{0.2}$) TiO$_3$ (SLT). The electrolyte may be comprised of any suitable material such as, for example, yttria-stabilized zirconia (YSZ), (La$_{0.6}$Sr$_{0.4}$)(Ga$_{0.8}$Mg$_{0.2}$)O$_3$(LSGM), Sc-stabilized zirconia (SSZ), and doped ceria. A SOEC cell architecture includes both electrode- and electrolyte-supported cell constructions and ceramic or metallic interconnects.

The electrolyzer 130 can operate in a co-electrolysis mode in which a first portion 124-1 of carbon dioxide rich gas stream 124 is fed to the anode 130-2 of the electrolyzer 130. The mixture output from the anode is then composed of oxygen enriched carbon dioxide stream 132 including oxygen ($O_2$) and carbon dioxide ($CO_2$) for sending to the combustion unit 110 in, for example, a continuous closed loop circuit. The amount of oxygen in the oxygen enriched carbon dioxide stream 132, i.e., $CO_2$ and $O_2$, can be adjusted to a desired level controlled by the purge rate of the $CO_2$ of the first portion 124-1 of carbon dioxide rich gas stream 124 to the anode 130-2 of the electrolyzer 130. As mentioned above, the percentage of oxygen by volume in the oxygen enriched carbon dioxide stream 132 can range from about 10% to about 50%, or from about 15% to about 30%, or from about 20% to about 25%.

The co-electrolysis mode further includes a combined stream 128 composed of steam feed stream 126 and a second portion 124-2 of carbon dioxide rich gas stream 124 fed to the cathode 130-4 of the electrolyzer 130. The mixture output from the cathode is then composed of syngas stream 134 including hydrogen ($H_2$) and carbon monoxide (CO).

The syngas stream 134 can be coupled to a downstream reactor (not shown) such as, for example, a Fischer Tropsch reactor or any other chemical conversion setup that utilizes a CO/$H_2$ mixture to convert to hydrocarbons, or methanol which can then be converted to dimethyl ether or creating high value liquid fuels, such as gasoline, diesel, and jet fuel. For example, in illustrative embodiments, methanol can be converted to, for example, dimethyl ether, in the same or separate reactor by conventional techniques, e.g., by methanol synthesis and in-situ dehydration, in which the in-situ methanol conversion can alleviate the thermodynamic limits of methanol synthesis, resulting in higher dimethyl ether conversion. The produced methanol/dimethyl ether products can be purified and collected following conventional fractional distillation. As another example, in illustrative embodiments, the syngas stream 134 can be used to generate one or more Fischer Tropsch products, including refinery/petrochemical feedstocks, transportation fuels, synthetic crude oil, liquid fuels, lubricants, alpha olefins, waxes, and combinations thereof. The reaction can be carried out in any type of reactor, e.g., fixed bed, moving bed, fluidized bed, slurry, bubbling bed, etc. using copper, ruthenium, iron or cobalt based catalysts, or combination thereof, under conditions ranging from about 190° C. to about 450° C., depending on the reactor configuration.

The Fischer Tropsch products are liquids, which can be shipped to a refinery site for further chemical reacting and upgrading to a variety of hydrocarbon products including paraffin solvents which can be hydrotreated to remove olefin impurities, or employed without hydrotreating to generate a wide variety of wax products. Liquid hydrocarbon products of $C_{16+}$ can be upgraded by various hydroconversion reactions such as by hydrocracking, hydroisomerization catalytic dewaxing, isodewaxing, or combinations thereof, to generate mid-distillates, diesel and jet fuels such as low freeze point jet fuel, high cetane jet fuel, and the like. In addition, isoparaffinic solvents, lubricants, lube oil blending components and lube oil base stocks suitable for transportation vehicles, non-toxic drilling oils suitable for use in drilling muds, technical and medicinal grade white oil, chemical raw materials, and various specialty products are useful derivatives.

In one or more illustrative embodiments, as depicted in FIG. 1, a system processing environment 200 comprises each of the components of system 100 described herein, as well as a controller 210 operatively coupled to system 100. Controller 210 is configured to control operations of one or more of the components of system 100 discussed above. In one illustrative embodiment, controller 210 is configured to actuate one or more of the functionalities of system 100 described herein. For example, controller 210 can comprise one or more processing devices configured to load software instructions from one or more memory devices and execute the software instructions to generate data and/or control signals that can be applied to one or more components of system 100 so as to actuate the functionalities described herein. Actuation of the components by the data and/or control signals may be affected electrically, electromechanically, electrochemically, and/or the like, depending on the nature of the specific component of system 100 being actuated.

Thus, in some embodiments, controller 210 comprises a combination of hardware and software components. For example, the one or more processing devices of controller 210 may comprise one or more microprocessors, one or more microcontrollers, one or more application-specific devices, or other types of processing circuitry, as well as portions or combinations thereof. Further, the one or more memory devices of controller 210 may comprise random access memory (RAM), read-only memory (ROM), or other types of memory, in any combination. It is to be appreciated that the specific architecture of controller 210 is configurable based on the components of system 100 and the functionalities they are intended to perform.

For example, controller 210 can be operatively connected to a processing device in a processing platform which comprises a processor coupled to a memory. The processor may comprise a microprocessor, a microcontroller, an application-specific integrated circuit (ASIC), a field-programmable gate array (FPGA) or other types of processing circuitry, as well as portions or combinations of such circuitry elements. The memory may comprise random access memory (RAM), read-only memory (ROM) or other types of memory, in any combination.

A process for converting carbon dioxide to syngas utilizing spent catalyst from an FCC reactor unit as a fuel for combusting with an oxygen enriched carbon dioxide stream from an electrolyzer anode outlet of an electrolyzer will now be described with reference to FIG. 2.

Figure 2:
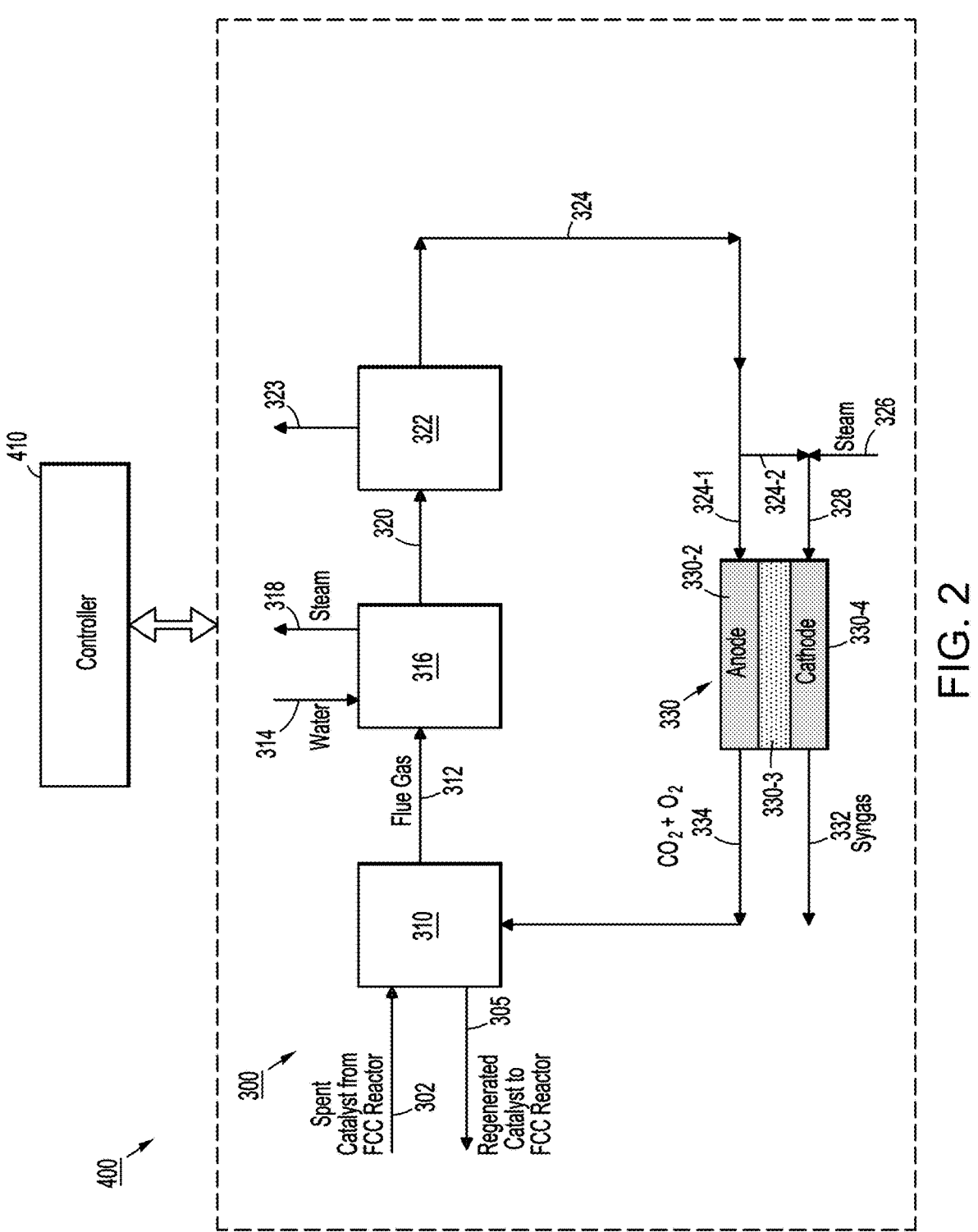
FIG. 2 illustrates a process and system for the conversion of carbon dioxide to syngas, according to an illustrative embodiment.

With reference to FIG. 2, system 300 includes regeneration unit 310 for receiving a spent catalyst stream 302 from an FCC reactor unit and an oxygen enriched carbon dioxide stream 334 from anode 330-2 of electrolyzer 330 comprising an anode 330-2, a cathode 330-4, and an electrolyte 330-3 inserted between the anode 330-2 and the cathode 330-4 where the oxygen enriched carbon dioxide stream 334 and the spent catalyst stream 302 are combusted to generate a hot flue gas stream 312 including carbon dioxide, steam and relatively low concentrations of unconsumed oxygen produced from the combustion reaction. In illustrative embodiments, the hot flue gas stream 312 is typically a hot flue gas stream having a temperature of at least about 500° C. In another embodiment, the hot flue gas stream 312 has a temperature ranging from about 500° C. to about 750° C.

In illustrative embodiments, the spent catalyst stream 302 is received from an FCC reactor unit where one or more petroleum and/or renewable feedstocks are typically introduced into the reactor along with a particulate catalyst and subjected to reaction conditions. The particulate catalyst is the regenerated catalyst stream 305 received from regeneration unit 310 after completion of the combustion process along with any fresh catalyst fed into the FCC reactor unit. As one skilled in the art will readily understand, during the reaction, coke will be formed in the fluid bed reactor, catalytically or thermally, when the one or more petroleum and/or renewable feedstocks are in contact with the particulate catalyst. The coke formed can be deposited on the surface of the particulate catalyst, thereby forming spent catalyst comprising the particulate catalyst and coke deposits, i.e., coked-catalyst particulates.

As depicted in FIG. 2, the spent catalyst stream 302 is continuously introduced to regeneration unit 310 along with oxygen enriched carbon dioxide stream 334 where the spent catalyst stream 302 is subjected to coke burning conditions to burn most, if not all, of the coke from the spent catalyst and provide a regenerated catalyst stream 305 and a hot flue gas stream 312. The coke can be burned from the spent catalyst stream 302 by exposing the spent catalyst to oxygen enriched carbon dioxide stream 334, at appropriate high temperature and time duration conditions to burn off and remove substantially all coke deposits from the catalyst. In an illustrative embodiment, a temperature can range from about 450° C. to about 850° C., and a time period can range from about 5 minutes to about 600 minutes. Accordingly, regenerating the spent catalyst stream 302 generally comprises combustion of the spent catalyst stream 302 and oxygen enriched carbon dioxide stream 334 in an oxidizing atmosphere to burn the coke deposits In an illustrative embodiment, hot flue gas stream 312 including carbon dioxide stream, steam and unconsumed oxygen produced from the combustion reaction is rich in carbon dioxide relative to oxygen, e.g., contains greater than or equal to 80% carbon dioxide, and less than or equal to 10% oxygen. For example, the percentage of carbon dioxide by volume in the hot flue gas stream 312 can be similar to the hot flue gas stream 112 discussed above, e.g., the percentage of carbon dioxide by volume in the hot flue gas stream 312 can range from about 80% to about 95%, or from about 85% to about 90%, and the percentage of steam by volume in the hot flue gas stream 312 can be up to about 10%. In addition, the percentage of unconsumed oxygen by volume in the hot flue gas stream 312 can range from about 1% to about 5%, or from about 2% to about 3%. The hot flue gas stream 312 can further contain one or more additional gases such as, for example, $NO_x$, COS, and $SO_x$.

System 300 further includes heat exchanger 316 for receiving water stream 314 at or around room temperature, i.e., about 20° C., and hot flue gas stream 312 as a heat transfer medium to provide a steam stream effluent 318 and a cooled flue gas stream effluent 320. In an illustrative embodiment, the hot flue gas stream 312 is cooled against water stream 314 in heat exchanger 316, which evaporates liquid water into steam stream effluent 318. In some embodiments, the heat exchanger 316 can be the same as discussed above for the heat exchanger 116.

System 300 further includes separation unit 322 for receiving cooled flue gas stream effluent 320 to separate out at least one $SO_x$ in the cooled flue gas stream effluent 320 as well as water and to generate a carbon dioxide rich gas stream 324, i.e., a high purity carbon dioxide stream, and a carbon dioxide lean gas stream 323. In an illustrative embodiment, carbon dioxide rich gas stream 324 can contain a percentage of carbon dioxide by volume in the carbon dioxide rich gas stream 324 of greater than or equal to about 95%, where the remaining amount contains unconsumed oxygen. In an illustrative embodiment, carbon dioxide rich gas stream 324 can contain a percentage of carbon dioxide by volume in the carbon dioxide rich gas stream 324 of greater than or equal to about 96%, where the remaining amount contains unconsumed oxygen. In an illustrative embodiment, carbon dioxide rich gas stream 324 can contain a percentage of carbon dioxide by volume in the carbon dioxide rich gas stream 324 of no greater than or equal to about 97%, where the remaining amount contains unconsumed oxygen.

Separation unit 322 for generating carbon dioxide lean gas stream 323 and carbon dioxide rich gas stream 324 from cooled flue gas stream effluent 320 can be any separation unit known in the art for removing at least one $SO_x$ and water. In an illustrative embodiment, separation unit 322 is a limestone scrubber.

If desired, system 300 can further include one or more additional separation units. For example, in the case where it is desired to remove the unconsumed oxygen from cooled flue gas stream effluent 320, system 300 can further include an oxygen separation unit (not shown). The oxygen separation unit can be before or after separation unit 322. In an illustrative embodiment, when further separating out unconsumed oxygen, carbon dioxide rich gas stream 324 can contain a percentage of carbon dioxide by volume in the carbon dioxide rich gas stream 324 of greater than or equal to about 98%. In an illustrative embodiment, carbon dioxide rich gas stream 324 can contain a percentage of carbon dioxide by volume in the carbon dioxide rich gas stream 324 of greater than or equal to about 99%. In an illustrative embodiment, carbon dioxide rich gas stream 324 can contain a percentage of carbon dioxide by volume in the carbon dioxide rich gas stream 324 of up to about 99.5%.

In one embodiment, from about 95% to about 99.5% of carbon dioxide in cooled flue gas stream effluent 320 has been removed to form carbon dioxide lean gas stream 323. The carbon dioxide rich gas stream 324 can contain some amount of steam generated from the combustion reaction in the regeneration unit 310. The carbon dioxide rich gas stream 324 is split in a first portion 324-1 for sending to the anode 330-2 of electrolyzer 330 and second portion 324-2 for combining with steam feed stream 326 to form combined stream 328 for sending to the cathode 330-4 of electrolyzer 330. Carbon dioxide lean gas stream 323 can also be referred to as a waste stream 323 which is essentially depleted of carbon dioxide and contains, for example, the steam, unconsumed oxygen (when removed) and $SO_x$ as well as any other unwanted chemicals.

System 300 further includes electrolyzer 330 for receiving for receiving first portion 324-1 of carbon dioxide rich gas stream 324 in anode 330-2 to generate oxygen enriched carbon dioxide stream 334 for sending to the regeneration unit 310, and receiving combined stream 328 composed of second portion 324-2 of carbon dioxide rich gas stream 324 and steam feed stream 326 in cathode 330-4 to generate a syngas stream 332 including carbon monoxide (CO) and hydrogen ($H_2$) for sending downstream for further processing as discussed below. The electrolyzer 330 can be any suitable high temperature electrolyzer as discussed above for electrolyzer 130. In some embodiments, the combined stream 328 composed of second portion 324-2 of carbon dioxide rich gas stream 324 and steam feed stream 326 participates in a reaction in a solid oxide electrolytic cell (SOEC) (electrolyzer 330) to generate syngas stream 332 and an oxygen enriched stream 334, and the first portion 324-1 of carbon dioxide rich gas stream 324 participates as a purge gas. For example, the combined stream 328 composed of second portion 324-2 of carbon dioxide rich gas stream 324 and steam feed stream 326 may be reacted at a cathode 330-4 in the electrolyzer 330 and the first portion 324-1 of carbon dioxide rich gas stream 324 may participate as a purge gas at an anode 330-2 of the electrolyzer 330, where the cathode 330-4 and anode 330-2 may be separated by an electrolyte 330-3. In some embodiments, the SOEC may operate at a temperature and pressure discussed above for electrolyzer 130. For example, in illustrative embodiments, the cathode may operate at a temperature between about 750° C. to about 850° C., and the anode may operate at a temperature between about 750° C. to about 850° C. The material of the solid oxide electrolyzer electrodes can be any of those discussed above.

The electrolyzer 330 can operate in a co-electrolysis mode in which a first portion 324-1 of carbon dioxide rich gas stream 324 is fed to the anode 330-2 of the electrolyzer 330. The output from the anode 330-2 is then composed of oxygen enriched carbon dioxide stream 334 including oxygen ($O_2$) and carbon dioxide ($CO_2$) for sending to the regeneration unit 310 in, for example, a continuous closed loop circuit. The co-electrolysis mode further includes a combined stream 328 composed of second portion 324-2 of carbon dioxide rich gas stream 324 and steam feed stream 326 fed to the cathode 330-4 of the electrolyzer 330. The mixture output from the cathode 330-4 is then composed of syngas stream 332 including hydrogen ($H_2$) and carbon monoxide (CO) which is sent to a downstream processing unit as discussed above.

In one or more illustrative embodiments, as depicted in FIG. 2, a system processing environment 400 comprises each of the components of system 300 described herein, as well as a controller 410 operatively coupled to system 300. Controller 410 is configured to control operations of one or more of the components of system 300 discussed above. In one illustrative embodiment, controller 410 is configured to actuate one or more of the functionalities of system 300 described herein. For example, controller 410 can be similar to controller 210 described above and function in a similar manner.

Figure 3:
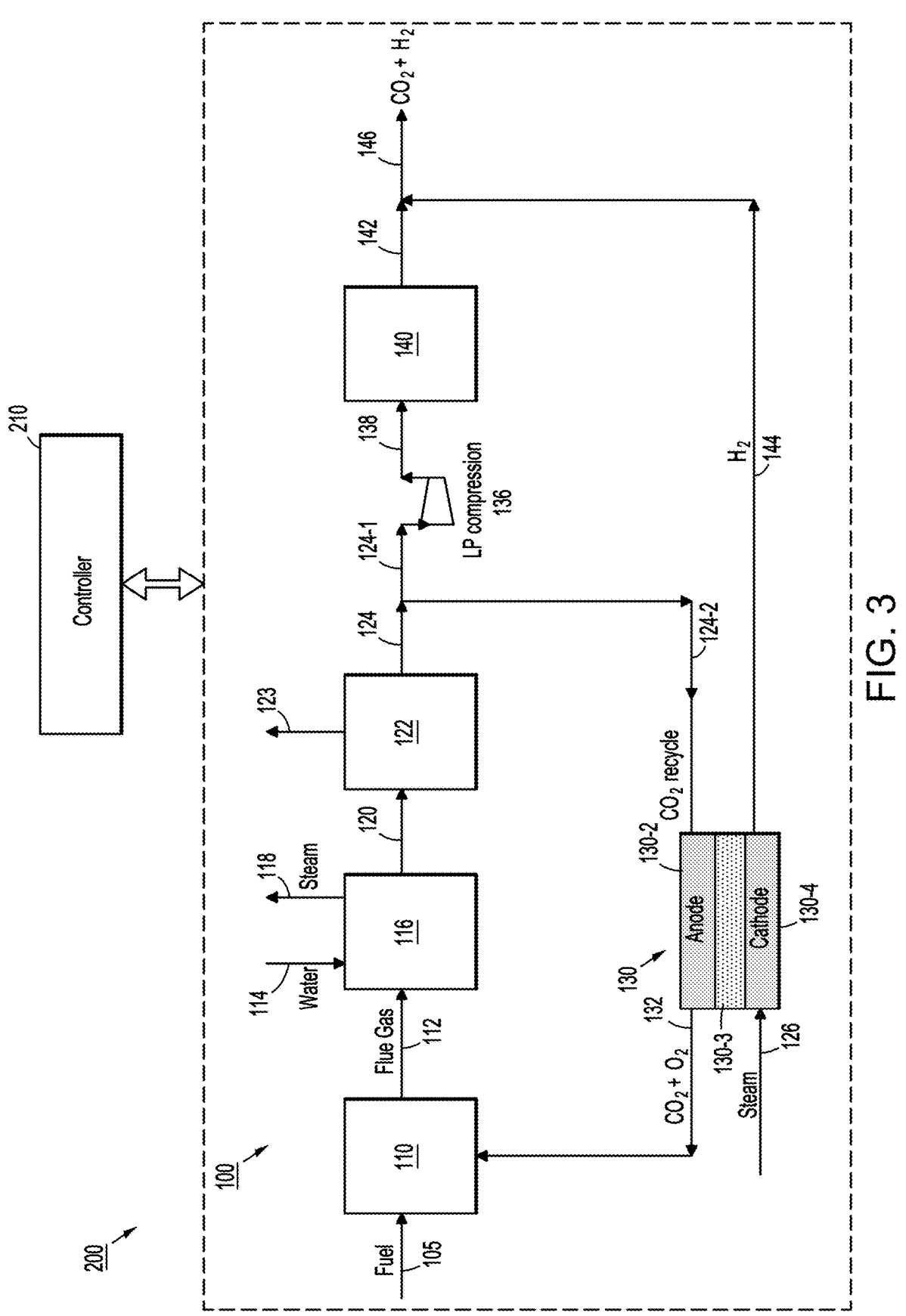
FIG. 3 illustrates a process and system for integration of steam electrolysis to generate hydrogen from the cathode and an oxygen enriched stream from the anode for combustion in the combustion unit with a fuel to generate flue gas, according to an illustrative embodiment.

An alternative embodiment of FIG. 1 will now be described with reference to FIG. 3 starting with carbon dioxide rich gas stream 124 exiting separation unit 122. As depicted in FIG. 3, a first portion 124-1 of carbon dioxide rich gas stream 124 leaves separation unit 122 and is passed through one or more compression units 136 (e.g., pumps, compressors, etc.) to increase the pressure of the first portion 124-1 of carbon dioxide rich gas stream 124 to generate a compressed carbon dioxide rich gas stream 138. The compressor can be any compressor suitable for compressing carbon dioxide, or can include any configuration of multiple compressors of any suitable type. In illustrative embodiments, suitable compressors can include, for example, centrifugal compressors, axial flow compressors, reciprocating compressors, combinations thereof, and the like. In an illustrative embodiment, the first portion 124-1 of carbon dioxide rich gas stream 124 can be compressed from a first pressure to a second pressure greater than the first pressure, e.g., at least about 0.1 MPa to about 30 MPa. In some embodiments, a single compressor unit can be used to increase the pressure of the first portion 124-1 of carbon dioxide rich gas stream 124 to the desired pressure described herein for introduction of the compressed carbon dioxide rich gas stream 138 into the dehydration unit 140.

As discussed above with respect to FIG. 1, the carbon dioxide rich gas stream 124 can contain some amount of steam generated from the combustion reactions in the combustion unit 110. Accordingly, compressed carbon dioxide rich gas stream 138 will be fed to dehydration unit 140 to remove a majority of water, if not all of the water, in compressed carbon dioxide rich gas stream 138 to generate a dehydrated carbon dioxide rich gas stream 142 for combining with hydrogen (H$_2$) effluent 144 generated from cathode 130-4 of electrolyzer 130 as discussed below. In alternative embodiments, the dehydration unit 140 may be placed before the compression unit 136 (i.e., between the separation unit 122 and the compression unit 136) or, when multiple compression stages or multiple compressors are used, the dehydration unit 140 may be placed between the multiple compression stages or multiple compressors.

System 100 further includes electrolyzer 130 for receiving second portion 124-2 of carbon dioxide rich gas stream 124 into the anode 130-2 and steam (H$_2$O) feed stream 126 into the cathode 130-4 to generate oxygen enriched carbon dioxide stream 132 from the anode 130-2 for sending to the combustion unit 110 and a hydrogen (H$_2$) effluent 144 from the cathode 130-4 for combining with dehydrated carbon dioxide rich gas stream 142 for further processing.

In this embodiment, electrolyzer 130 utilizes steam electrolysis in which a first portion 124-2 of carbon dioxide rich gas stream 124 is fed to the anode 130-2 of the electrolyzer 130 and steam (H$_2$O) feed stream 126 is fed into the cathode 130-4 of the electrolyzer 130. The mixture output from the anode is then composed of oxygen enriched carbon dioxide stream 132 including oxygen (O$_2$) and carbon dioxide (CO$_2$) for sending to the combustion unit 110 in, for example, a continuous closed loop circuit. The output from the cathode is then composed of hydrogen (H$_2$) effluent 144 to be combined with dehydrated carbon dioxide rich gas stream 142 and to form a carbon dioxide (CO$_2$) and hydrogen (H$_2$) stream 146.

The carbon dioxide (CO$_2$) and hydrogen (H$_2$) stream 146 can be sent for further processing. For example, in illustrative embodiments, the carbon dioxide (CO$_2$) and hydrogen (H$_2$) stream 146 can be utilized to make syngas through reverse water gas shift (RWGS) reaction and/or directly fed into a downstream synthesis unit for further processing such as forming methanol, or any other desired chemical product or fuel. In illustrative embodiments, the syngas can be sent to a Fischer Tropsch reactor or any other chemical conversion setup that utilizes a CO/H$_2$ mixture to convert to hydrocarbons, or methanol which can then be converted to dimethyl ether or creating high value liquid fuels, such as gasoline, diesel, and jet fuel. For example, in illustrative embodiments, the syngas can be converted into a Fischer Tropsch product as discussed above for stream 134.

As an overview, for high-temperature steam electrolysis (HTSE), steam (H$_2$O) is injected into the cathode compartment of the electrolyzer. Under the effect of the electrical current applied to the cell, the dissociation of water molecules in the form of steam occurs at the interface between the hydrogen electrode (cathode) and the electrolyte, where this dissociation produces dihydrogen gas (H$_2$) and oxygen ions (O$^{2-}$). Dihydrogen (H$_2$) is collected and discharged at the outlet of the hydrogen compartment. The oxygen ions (O$^{2-}$) migrate through the electrolyte and recombine to form dioxygen (O$_2$) at the interface between the electrolyte and the oxygen electrode (anode). A draining gas, such as air, can circulate at the anode and thus collect the oxygen generated in gas form at the anode.

Figure 4:
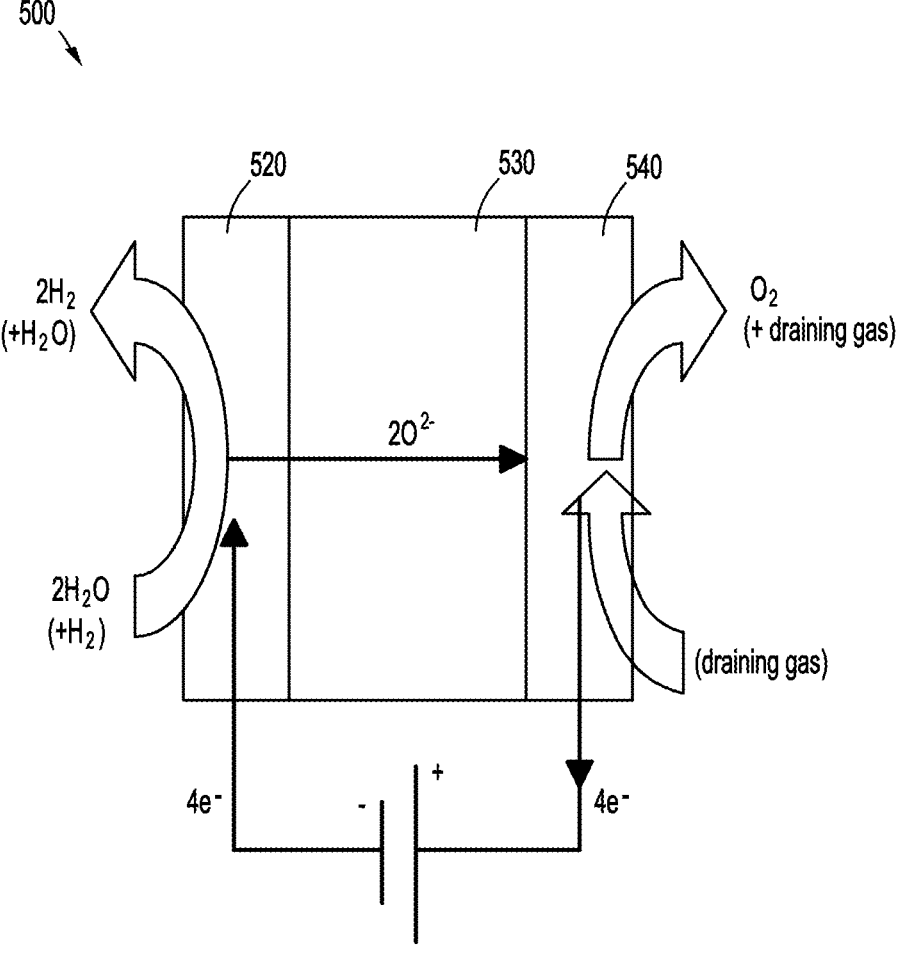
FIG. 4 is a schematic view showing a high-temperature solid-oxide electrolyzer (SOEC), according to an illustrative embodiment.

In an illustrative embodiment, FIG. 4 shows a schematic view of the principle of operation of a high-temperature solid-oxide electrolyzer (SOEC). Such an electrolyzer is an electrochemical device for producing hydrogen (and oxygen) under the effect of an electrical current. In these electrolyzers, the high-temperature electrolysis of water is performed using steam. Thus, the function of such an electrolyzer is to transform the steam into hydrogen and oxygen according to the following electrochemical reaction:

$$2H_2O \rightarrow 2H_2 + O_2$$

This reaction occurs electrochemically in the cells of the electrolyzer. As schematically shown in FIG. 4, each basic electrolysis cell 500 is formed by a cathode 520 and an anode 540, placed on either side of a solid electrolyte 530. The two electrodes (i.e., cathode 520 and anode 540) are electronic and/or ionic conductors, made of porous material, and the solid electrolyte 530 is impervious to gas, an electronic insulator and an ion conductor. The solid electrolyte 530 may in particular be an anion conductor, and more specifically an anion conductor of O$^{2-}$ ions, and the electrolyzer is then referred to as an anion electrolyzer, by contrast with proton electrolytes (HT).

The electrochemical reactions occur at the interface between each of the electronic conductors and the ion conductor.

At the cathode 520, the half-reaction is as follows:

$$2H_2O + 4e^- \rightarrow 2H_2 + 2O^{2-}.$$

At the anode 440, the half-reaction is as follows:

$$2O^{2-} \rightarrow O_2 + 4e^-.$$

The solid electrolyte 530, inserted between the two electrodes, i.e., cathode 520 and anode 540, is the site of migration of the O$^{2-}$ ions under the effect of the electrical field created by the difference in potential imposed between anode 540 and cathode 520.

As indicated between parentheses in FIG. 4, the steam at the cathode inlet can be accompanied by hydrogen H$_2$ and the hydrogen produced and recovered at the outlet can be accompanied by steam. Similarly, a draining gas, such as a purge gas such as air, carbon dioxide or other inert gas may also be injected at the inlet to discharge the oxygen produced. The injection of a draining gas has the additional function of acting as a temperature controller.

A basic electrolyzer, or electrolysis reactor, therefore consists of a basic cell as described above, with a cathode, an electrolyte, and an anode, and two monopolar connectors, which provide electrical, hydraulic and thermal distribution functions.

To increase the flow rates of hydrogen and oxygen produced, a stack of a plurality of basic electrolysis cells one on top of another can be used, separating them with interconnection devices, usually called interconnectors or bipolar interconnection plates. The assembly is positioned between two end interconnection plates that support the electrical and gas supplies of the electrolyzer (electrolysis reactor).

A high-temperature solid-oxide electrolyzer (SOEC) thus comprises at least one, and generally a plurality of electrolysis cells stacked one on top of another, each basic cell being formed by an electrolyte, a cathode and an anode, the electrolyte being inserted between the cathode and the anode.

Thus, the function of a so-called cathode compartment is to distribute the electrical current and steam as well as to recover hydrogen at the cathode in contact.

The function of a so-called anode compartment is to distribute the electrical current and to recover oxygen at the anode in contact, optionally by means of a draining gas.

In some embodiments, the SOEC may operate at a temperature and pressure discussed above. For example, in illustrative embodiments, the cathode may operate at a temperature between about 750° C. to about 850° C., and the anode may operate at a temperature between about 750° C. to about 850° C. The material of the solid oxide electrolyzer electrodes can be any of those discussed above.

In illustrative embodiments, the carbon dioxide ($CO_2$) and hydrogen ($H_2$) stream 146 can be utilized to make syngas through reverse water gas shift (RWGS) reaction or directly fed into a downstream synthesis unit for further processing.

In one or more illustrative embodiments, as depicted in FIG. 3, a system processing environment 200 comprises each of the components of system 100 described herein, as well as a controller 210 operatively coupled to system 100 as discussed above.

Figure 5:
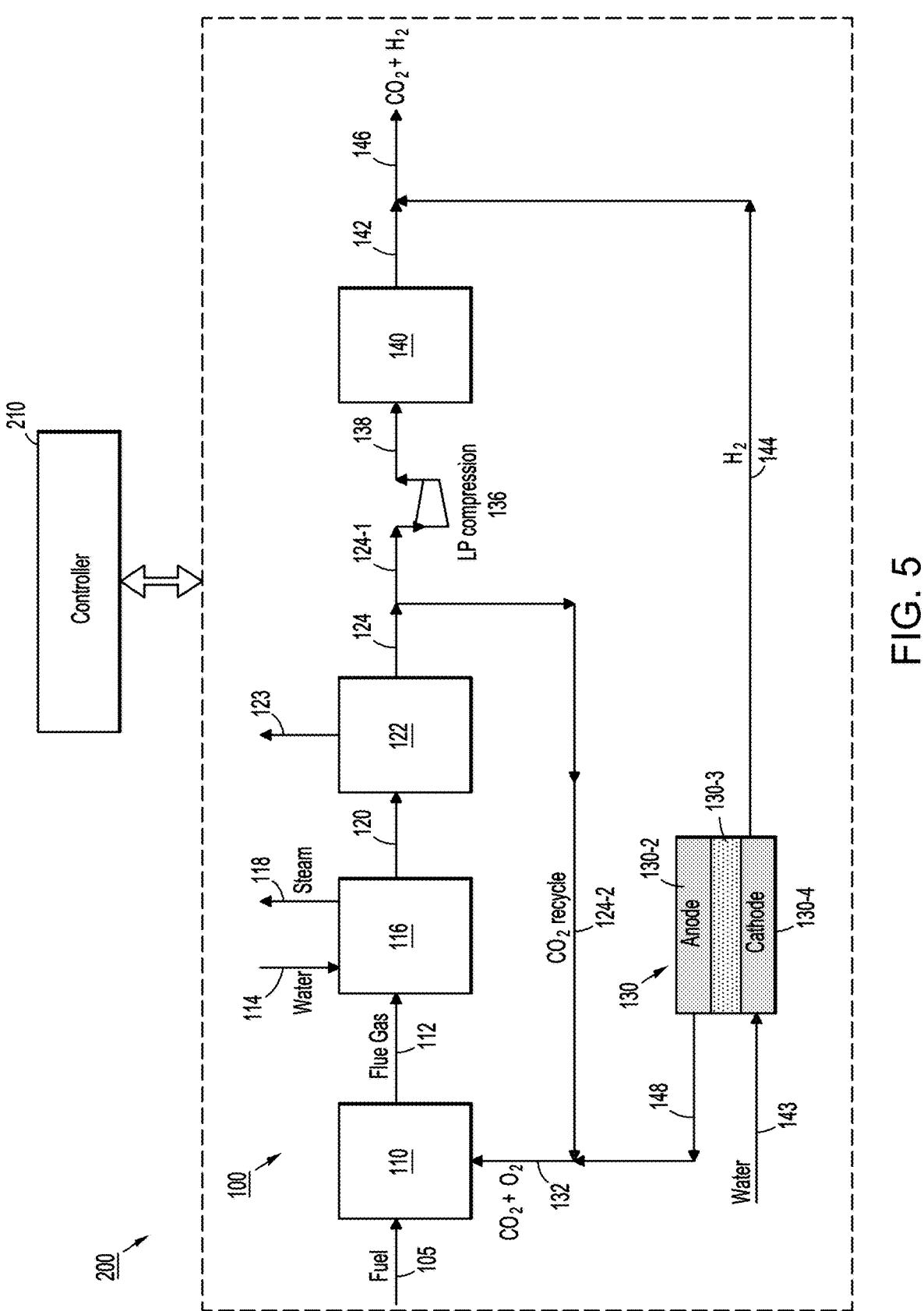
FIG. 5 illustrates a process and system for integration of water electrolyzer to generate hydrogen from the cathode and an oxygen stream from the anode for combustion in the combustion unit with a fuel to generate flue gas, according to an illustrative embodiment.

An alternative embodiment of FIGS. 1 and 3 will now be described with reference to FIG. 5 starting with carbon dioxide rich gas stream 124 exiting separation unit 122. As discussed above with reference to FIG. 3, a first portion 124-1 of carbon dioxide rich gas stream 124 leaves separation unit 122 and is passed through one or more compression units 136 (e.g., pumps, compressors, etc.) to increase the pressure of the first portion 124-1 of carbon dioxide rich gas stream 124 to generate a compressed carbon dioxide rich gas stream 138, followed by sending compressed carbon dioxide rich gas stream 138 to dehydration unit 140 to remove water in compressed carbon dioxide rich gas stream 138 to generate a dehydrated carbon dioxide rich gas stream 142. In illustrative embodiments, some amount of water may remain to assist with transporting the dehydrated carbon dioxide rich gas stream 142 downstream for further processing.

A second portion 124-2 of carbon dioxide rich gas stream 124 is recycled back and combined with oxygen stream 148 from the anode 130-2 of electrolyzer 130 as oxygen enriched carbon dioxide stream 132.

System 100 further includes electrolyzer 130 for receiving water ($H_2O$) stream 143 into the cathode 130-4 to generate hydrogen ($H_2$) effluent 144, and to generate oxygen stream 148 from the anode 130-2 for combining with second portion 124-2 of carbon dioxide rich gas stream 124 to form oxygen enriched carbon dioxide stream 132 including oxygen ($O_2$) and carbon dioxide ($CO_2$). In this embodiment, electrolyzer 130 that is utilized in the systems and processes of the present disclosure may be of any suitable type that is appropriate for splitting water molecules into separate streams of hydrogen and oxygen. Such electrolyzers can range in size from small, appliance-sized equipment that is well-suited for small-scale distributed hydrogen production, to large-scale central production facilities that can be connected directly to renewable or other forms of low-cost electricity production. In illustrative embodiments, low temperature alkaline electrolyzers or proton exchange membrane (PEM) electrolyzers may be employed in various embodiments.

In this embodiment, electrolyzer 130 utilizes water electrolysis in which water ($H_2O$) stream 143 is fed into the cathode 130-4 of the electrolyzer 130. The output from the cathode 130-4 is then composed of hydrogen ($H_2$) effluent 144 to be combined with dehydrated carbon dioxide rich gas stream 142 and form a carbon dioxide ($CO_2$) and hydrogen ($H_2$) stream 146. In illustrative embodiments, the carbon dioxide ($CO_2$) and hydrogen ($H_2$) stream 146 can be utilized to make syngas through reverse water gas shift (RWGS) reaction or directly fed into a downstream synthesis unit for further processing. The output from the anode 130-4 is then composed of oxygen stream 148 including oxygen ($O_2$) for combining with second portion 124-2 of carbon dioxide rich gas stream 124 and sent to the combustion unit 110 in, for example, a continuous closed loop circuit.

According to an aspect of the present disclosure, a method comprises:

(a) combusting a fuel stream in a combustion unit in the presence of a first oxygen enriched carbon dioxide stream received from an anode of an electrolyzer comprising an anode, a cathode, and an electrolyte inserted between the anode and the cathode to generate a hot flue gas stream comprising carbon dioxide, steam, unconsumed oxygen, $NO_x$ and $SO_x$, (b) cooling the hot flue gas stream in a heat exchanger by supplying a water stream to the heat exchanger as a heat transfer medium to generate a cooled flue gas stream effluent, (c) processing the cooled flue gas stream effluent in one or more separation units to generate a carbon dioxide rich gas stream and a carbon dioxide lean gas stream, and (d) passing the carbon dioxide rich gas stream to the anode of the electrolyzer to generate a second oxygen enriched carbon dioxide stream for sending to the combustion unit.

In one or more additional illustrative embodiments, as may be combined with the preceding paragraphs, the fuel stream is a hydrocarbon-based fuel.

In one or more additional illustrative embodiments, as may be combined with the preceding paragraphs, the fuel stream is spent catalyst received from a fluid catalytic cracking reactor unit and the combustion unit is a catalyst regeneration unit.

In one or more additional illustrative embodiments, as may be combined with the preceding paragraphs, the first and second oxygen enriched carbon dioxide streams each comprise from about 10% to about 50% by volume of oxygen and the carbon dioxide rich gas stream comprises greater than about 95% and up to about 99.5% by volume of carbon dioxide.

In one or more additional illustrative embodiments, as may be combined with the preceding paragraphs, the hot flue gas stream has a temperature of at least about 500° C.

In one or more additional illustrative embodiments, as may be combined with the preceding paragraphs, processing the cooled flue gas stream in one or more separation units comprises removing $SO_x$ in a limestone separation unit.

In one or more additional illustrative embodiments, as may be combined with the preceding paragraphs, the carbon dioxide rich gas stream is split into a first portion and a second portion, and the method further comprising (i) passing the first portion of the carbon dioxide rich gas stream to the anode of the electrolyzer and (ii) passing the second portion of the carbon dioxide rich gas stream to the cathode of the electrolyzer with a steam stream to generate a syngas stream including carbon monoxide and hydrogen.

In one or more additional illustrative embodiments, as may be combined with the preceding paragraphs, the method further comprises converting the syngas to one or more of a hydrocarbon, methanol, dimethyl ether, or a fuel.

In one or more additional illustrative embodiments, as may be combined with the preceding paragraphs, the carbon dioxide rich gas stream is split into a first portion and a second portion, and the method further comprising:

passing a steam stream to the cathode of the electrolyzer to generate a hydrogen effluent, compressing the second portion of the carbon dioxide rich gas stream in a compression unit to generate a compressed carbon dioxide rich gas stream, removing water in the compressed carbon dioxide rich gas stream in a dehydration unit to generate a dehydrated carbon dioxide rich gas stream, and combining the dehydrated carbon dioxide rich gas stream with the hydrogen effluent.

In one or more additional illustrative embodiments, as may be combined with the preceding paragraphs, the method further comprises converting the dehydrated carbon dioxide rich gas stream and the hydrogen effluent to one or more of a hydrocarbon, methanol, dimethyl ether, or a fuel.

In one or more additional illustrative embodiments, as may be combined with the preceding paragraphs, the electrolyzer is configured to operate in a co-electrolysis mode.

In one or more additional illustrative embodiments, as may be combined with the preceding paragraphs, the electrolyzer is a steam electrolyzer.

According to an aspect of the present disclosure, a system comprises:

(a) an electrolyzer comprising an anode, a cathode, and an electrolyte inserted between the anode and the cathode and configured to receive a first carbon dioxide rich gas stream to the anode to generate an oxygen enriched carbon dioxide stream, (b) a combustion unit configured to combust a fuel stream in the presence of the oxygen enriched carbon dioxide stream received from the anode of the electrolyzer to generate a hot flue gas stream comprising carbon dioxide, steam, unconsumed oxygen, $NO_x$ and $SO_x$.

(c) a heat exchanger configured to cool the hot flue gas stream by supplying a water stream as a heat transfer medium to generate a cooled flue gas stream effluent, and (d) one or more separation units configured to process the cooled flue gas stream to generate a second carbon dioxide rich gas stream and a carbon dioxide lean gas stream.

In one or more additional illustrative embodiments, as may be combined with the preceding paragraphs, the fuel stream is a hydrocarbon-based fuel.

In one or more additional illustrative embodiments, as may be combined with the preceding paragraphs, the fuel stream is spent catalyst received from a fluid catalytic cracking reactor unit and the combustion unit is a catalyst regeneration unit.

In one or more additional illustrative embodiments, as may be combined with the preceding paragraphs, the oxygen enriched carbon dioxide stream comprises from about 10 to about 50% by volume of oxygen, and the first and second carbon dioxide rich gas streams each comprise greater than about 95% and up to about 99.5% by volume of carbon dioxide.

In one or more additional illustrative embodiments, as may be combined with the preceding paragraphs, the second carbon dioxide rich gas stream is split into a first portion and a second portion, and the electrolyzer is further configured to receive the first portion of the second carbon dioxide rich gas stream to the anode and the second portion of the second carbon dioxide rich gas stream to the cathode with a steam stream to generate a syngas stream including carbon monoxide and hydrogen.

In one or more additional illustrative embodiments, as may be combined with the preceding paragraphs, the system further comprises one or more processing units configured to convert the syngas stream to one or more of a hydrocarbon, methanol, dimethyl ether, or a fuel.

In one or more additional illustrative embodiments, as may be combined with the preceding paragraphs, the second carbon dioxide rich gas stream is split into a first portion and a second portion, and the electrolyzer is further configured to receive the first portion of the second carbon dioxide rich gas stream to the anode, and the system further comprises:

a compression unit configured to compress the second portion of the second carbon dioxide rich gas stream to generate a compressed carbon dioxide rich gas stream, and a dehydration unit configured to remove water in the compressed carbon dioxide rich gas stream to generate a dehydrated carbon dioxide rich gas stream.

In one or more additional illustrative embodiments, as may be combined with the preceding paragraphs, the electrolyzer is further configured to receive a steam stream to the cathode of the electrolyzer to generate a hydrogen effluent for combining with the dehydrated carbon dioxide rich gas stream.

In one or more additional illustrative embodiments, as may be combined with the preceding paragraphs, the system further comprises one or more processing units for converting the combined hydrogen effluent and the dehydrated carbon dioxide rich gas stream to one or more of a hydrocarbon, methanol which can thereafter be converted to dimethyl ether or a fuel.

According to an aspect of the present disclosure, a method comprises:

(a) combusting a fuel stream in a combustion unit in the presence of a first oxygen enriched carbon dioxide stream to generate a hot flue gas stream comprising carbon dioxide, steam, unconsumed oxygen, $NO_x$ and $SO_x$, (b) cooling the hot flue gas stream in a heat exchanger by supplying a water stream to the heat exchanger as a heat transfer medium to generate a cooled flue gas stream effluent, (c) processing the cooled flue gas stream effluent in one or more separation units to generate a carbon dioxide rich gas stream and a carbon dioxide lean gas stream,

(d) generating an oxygen stream from an anode of an electrolyzer comprising an anode, a cathode, and an electrolyte inserted between the anode and the cathode, and (e) combining the oxygen stream and the carbon dioxide rich gas stream to generate a second oxygen enriched carbon dioxide stream for sending to the combustion unit.

In one or more additional illustrative embodiments, as may be combined with the preceding paragraphs, the fuel stream is a hydrocarbon-based fuel.

In one or more additional illustrative embodiments, as may be combined with the preceding paragraphs, the fuel stream is spent catalyst received from a fluid catalytic cracking reactor unit and the combustion unit is a catalyst regeneration unit.

In one or more additional illustrative embodiments, as may be combined with the preceding paragraphs, the first and second oxygen enriched carbon dioxide streams each comprise from about 10 to about 50% by volume of oxygen and the carbon dioxide rich gas stream comprises greater than about 95% and up to about 99.5% by volume of carbon dioxide.

In one or more additional illustrative embodiments, as may be combined with the preceding paragraphs, the hot flue gas stream has a temperature of at least about 500° C.

In one or more additional illustrative embodiments, as may be combined with the preceding paragraphs, processing the cooled flue gas stream in one or more separation units comprises removing $SO_x$ in a limestone separation unit.

In one or more additional illustrative embodiments, as may be combined with the preceding paragraphs, the carbon dioxide rich gas stream is split into a first portion and a second portion, where first portion is combined with the oxygen stream sent from the anode of the electrolyzer, and the method further comprises:

passing a water stream to the cathode of the electrolyzer to generate a hydrogen effluent, compressing the second portion of the carbon dioxide rich gas stream in a compression unit to generate a compressed carbon dioxide rich gas stream, removing water in the compressed carbon dioxide rich gas stream in a dehydration unit to generate a dehydrated carbon dioxide rich gas stream, and combining the dehydrated carbon dioxide rich gas stream with the hydrogen effluent.

In one or more additional illustrative embodiments, as may be combined with the preceding paragraphs, the combined first portion of the carbon dioxide rich gas stream and the oxygen stream are sent to the combustion unit.

In one or more additional illustrative embodiments, as may be combined with the preceding paragraphs, the method further comprises converting the dehydrated carbon dioxide rich gas stream and the hydrogen effluent to one or more of a hydrocarbon, methanol, dimethyl ether, or a fuel.

According to an aspect of the present disclosure, a system comprises:

(a) a combustion unit configured to combust a fuel stream in the presence of a first oxygen stream and a first carbon dioxide stream to generate a hot flue gas stream comprising carbon dioxide, steam, unconsumed oxygen, $NO_x$ and $SO_x$, (b) a heat exchanger configured to cool the hot flue gas stream by supplying a water stream as a heat transfer medium to generate a cooled flue gas stream effluent, and

(c) one or more separation units configured to process the cooled flue gas stream to generate a carbon dioxide rich gas stream and a carbon dioxide lean gas stream, and (d) an electrolyzer comprising an anode, a cathode, and an electrolyte inserted between the anode and the cathode and configured to generate a second oxygen stream from the anode of the electrolyzer.

In one or more additional illustrative embodiments, as may be combined with the preceding paragraphs, the fuel stream is a hydrocarbon-based fuel.

In one or more additional illustrative embodiments, as may be combined with the preceding paragraphs, the fuel stream is spent catalyst received from a fluid catalytic cracking reactor unit and the combustion unit is a catalyst regeneration unit.

In one or more additional illustrative embodiments, as may be combined with the preceding paragraphs, the oxygen enriched carbon dioxide stream comprises from about 10 to about 50% by volume of oxygen, and the first and second carbon dioxide rich gas streams each comprise greater than about 95% and up to about 99.5% by volume of carbon dioxide.

In one or more additional illustrative embodiments, as may be combined with the preceding paragraphs, where the one or more separation units include a limestone separation unit.

In one or more additional illustrative embodiments, as may be combined with the preceding paragraphs, the second carbon dioxide rich gas stream is split into a first portion and a second portion, where the first portion is combined with the oxygen stream sent from the anode of the electrolyzer to send to the combustion unit, and the system further comprises:

the electrolyzer is further configured to receive a water stream at the cathode to generate a hydrogen effluent, a compression unit configured to compress the second portion of the second carbon dioxide rich gas stream to generate a compressed carbon dioxide rich gas stream, and a dehydration unit configured to remove water in the compressed carbon dioxide rich gas stream in a dehydration unit to generate a dehydrated carbon dioxide rich gas stream for combining the dehydrated carbon dioxide rich gas stream with the hydrogen effluent.

In one or more additional illustrative embodiments, as may be combined with the preceding paragraphs, the system further comprises one or more processing units for converting the combined hydrogen effluent and the dehydrated carbon dioxide rich gas stream to one or more of a hydrocarbon, methanol, dimethyl ether, or a fuel.

Various features disclosed herein are, for brevity, described in the context of a single embodiment, but may also be provided separately or in any suitable sub-combination. All combinations of the embodiments are specifically embraced by the illustrative embodiments disclosed herein just as if each and every combination was individually and explicitly disclosed. In addition, all sub-combinations listed in the embodiments describing such variables are also specifically embraced by the present disclosure and are disclosed herein just as if each and every such sub-combination was individually and explicitly disclosed herein.

While the above description contains many specifics, these specifics should not be construed as limitations of the invention, but merely as exemplifications of preferred embodiments thereof. Those skilled in the art will envision many other embodiments within the scope and spirit of the invention as defined by the claims appended hereto.

23

24

What is claimed is:

1. A method, comprising:

combusting a fuel stream in a combustion unit in the presence of a first oxygen enriched carbon dioxide stream received from an anode of an electrolyzer comprising an anode, a cathode, and an electrolyte inserted between the anode and the cathode to generate a hot flue gas stream comprising carbon dioxide, steam, unconsumed oxygen, $NO_x$ and $SO_x$;

cooling the hot flue gas stream in a heat exchanger by supplying a water stream to the heat exchanger as a heat transfer medium to generate a cooled flue gas stream effluent;

processing the cooled flue gas stream effluent in one or more separation units to generate a carbon dioxide rich gas stream and a carbon dioxide lean gas stream; and passing the carbon dioxide rich gas stream to the anode of the electrolyzer to generate a second oxygen enriched carbon dioxide stream for sending to the combustion unit.

2. The method according to claim 1, wherein the fuel stream is a hydrocarbon-based fuel.

3. The method according to claim 1, wherein the fuel stream is spent catalyst received from a fluid catalytic cracking reactor unit and the combustion unit is a catalyst regeneration unit.

4. The method according to claim 1, wherein the first oxygen enriched carbon dioxide stream and the second oxygen enriched carbon dioxide stream each comprise from about 10% to about 50% by volume of oxygen and the carbon dioxide rich gas stream comprises greater than about 95% and up to about 99.5% by volume of carbon dioxide.

5. The method according to claim 1, wherein processing the cooled flue gas stream in one or more separation units comprises removing $SO_x$ in a limestone separation unit.

6. The method according to claim 1, wherein the carbon dioxide rich gas stream is split into a first portion and a second portion, the method further comprising passing the first portion of the carbon dioxide rich gas stream to the anode of the electrolyzer and passing the second portion of the carbon dioxide rich gas stream to the cathode of the electrolyzer with a steam stream to generate a syngas stream including carbon monoxide and hydrogen.

7. The method according to claim 6, wherein the electrolyzer is configured to operate in a co-electrolysis mode.

8. The method according to claim 6, further comprising converting the syngas stream to one or more of a hydrocarbon, methanol, dimethyl ether, or a fuel.

9. The method according to claim 1, wherein the carbon dioxide rich gas stream is split into a first portion and a second portion, wherein the first portion of the carbon dioxide rich gas stream is sent to the anode of the electrolyzer, the method further comprising:

passing a steam stream to the cathode of the electrolyzer to generate a hydrogen effluent;

compressing the second portion of the carbon dioxide rich gas stream in a compression unit to generate a compressed carbon dioxide rich gas stream;

removing water in the compressed carbon dioxide rich gas stream in a dehydration unit to generate a dehydrated carbon dioxide rich gas stream; and combining the dehydrated carbon dioxide rich gas stream with the hydrogen effluent.

10. A system, comprising:

an electrolyzer comprising an anode, a cathode, and an electrolyte inserted between the anode and the cathode and configured to receive a first carbon dioxide rich gas stream to the anode to generate an oxygen enriched carbon dioxide stream;

a combustion unit configured to combust a fuel stream in the presence of the oxygen enriched carbon dioxide stream received from the anode of the electrolyzer to generate a hot flue gas stream comprising carbon dioxide, steam, unconsumed oxygen, $NO_x$ and $SO_x$;

a heat exchanger configured to cool the hot flue gas stream by supplying a water stream as a heat transfer medium to generate a cooled flue gas stream effluent; and one or more separation units configured to process the cooled flue gas stream to generate a second carbon dioxide rich gas stream and a carbon dioxide lean gas stream.

11. The system according to claim 10, wherein the fuel stream is a hydrocarbon-based fuel.

12. The system according to claim 10, wherein the fuel stream is spent catalyst received from a fluid catalytic cracking reactor unit and the combustion unit is a catalyst regeneration unit.

13. The system according to claim 10, wherein the oxygen enriched carbon dioxide stream comprises from about 10% to about 50% by volume of oxygen, and the first carbon dioxide rich gas stream and the second carbon dioxide rich gas stream each comprise greater than about 95% and up to about 99.5% by volume of carbon dioxide.

14. The system according to claim 10, wherein the second carbon dioxide rich gas stream is split into a first portion and a second portion, and the electrolyzer is further configured to receive the first portion of the second carbon dioxide rich gas stream to the anode and the second portion of the second carbon dioxide rich gas stream to the cathode with a steam stream to generate a syngas stream including carbon monoxide and hydrogen.

15. The system according to claim 14, further comprising one or more processing units configured to convert the syngas stream to one or more of a hydrocarbon, methanol, dimethyl ether, or a fuel.

16. The system according to claim 10, wherein the second carbon dioxide rich gas stream is split into a first portion and a second portion, and the electrolyzer is further configured to receive the first portion of the second carbon dioxide rich gas stream to the anode, the system further comprising:

a compression unit configured to compress the second portion of the second carbon dioxide rich gas stream to generate a compressed carbon dioxide rich gas stream; and a dehydration unit configured to remove water in the compressed carbon dioxide rich gas stream to generate a dehydrated carbon dioxide rich gas stream.

17. The system according to claim 16, wherein the electrolyzer is further configured to receive a steam stream to the cathode of the electrolyzer to generate a hydrogen effluent for combining with the dehydrated carbon dioxide rich gas stream.

18. The system according to claim 17, further comprising one or more processing units for converting the hydrogen effluent with the dehydrated carbon dioxide rich gas stream to one or more of a hydrocarbon, methanol, dimethyl ether, or a fuel.

19. A method, comprising:

combusting a fuel stream in a combustion unit in the presence of a first oxygen enriched carbon dioxide stream to generate a hot flue gas stream comprising carbon dioxide, steam, unconsumed oxygen, $NO_x$ and $SO_x$;

cooling the hot flue gas stream in a heat exchanger by supplying a water stream to the heat exchanger as a heat transfer medium to generate a cooled flue gas stream effluent;

processing the cooled flue gas stream effluent in one or more separation units to generate a carbon dioxide rich gas stream and a carbon dioxide lean gas stream;

generating an oxygen stream from an anode of an electrolyzer comprising an anode, a cathode, and an electrolyte inserted between the anode and the cathode; and combining the oxygen stream and the carbon dioxide rich gas stream to generate a second oxygen enriched carbon dioxide stream for sending to the combustion unit.

20. The method according to claim 19, wherein the carbon dioxide rich gas stream is split into a first portion and a second portion, wherein the first portion of the carbon dioxide rich gas stream is combined with the oxygen stream sent from the anode of the electrolyzer, the method further comprising:

passing a water stream to the cathode of the electrolyzer to generate a hydrogen effluent;

compressing the second portion of the carbon dioxide rich gas stream in a compression unit to generate a compressed carbon dioxide rich gas stream;

removing water in the compressed carbon dioxide rich gas stream in a dehydration unit to generate a dehydrated carbon dioxide rich gas stream; and combining the dehydrated carbon dioxide rich gas stream with the hydrogen effluent.

\* \* \* \* \*